United States Patent Office 2,706,468
Patented Apr. 19, 1955

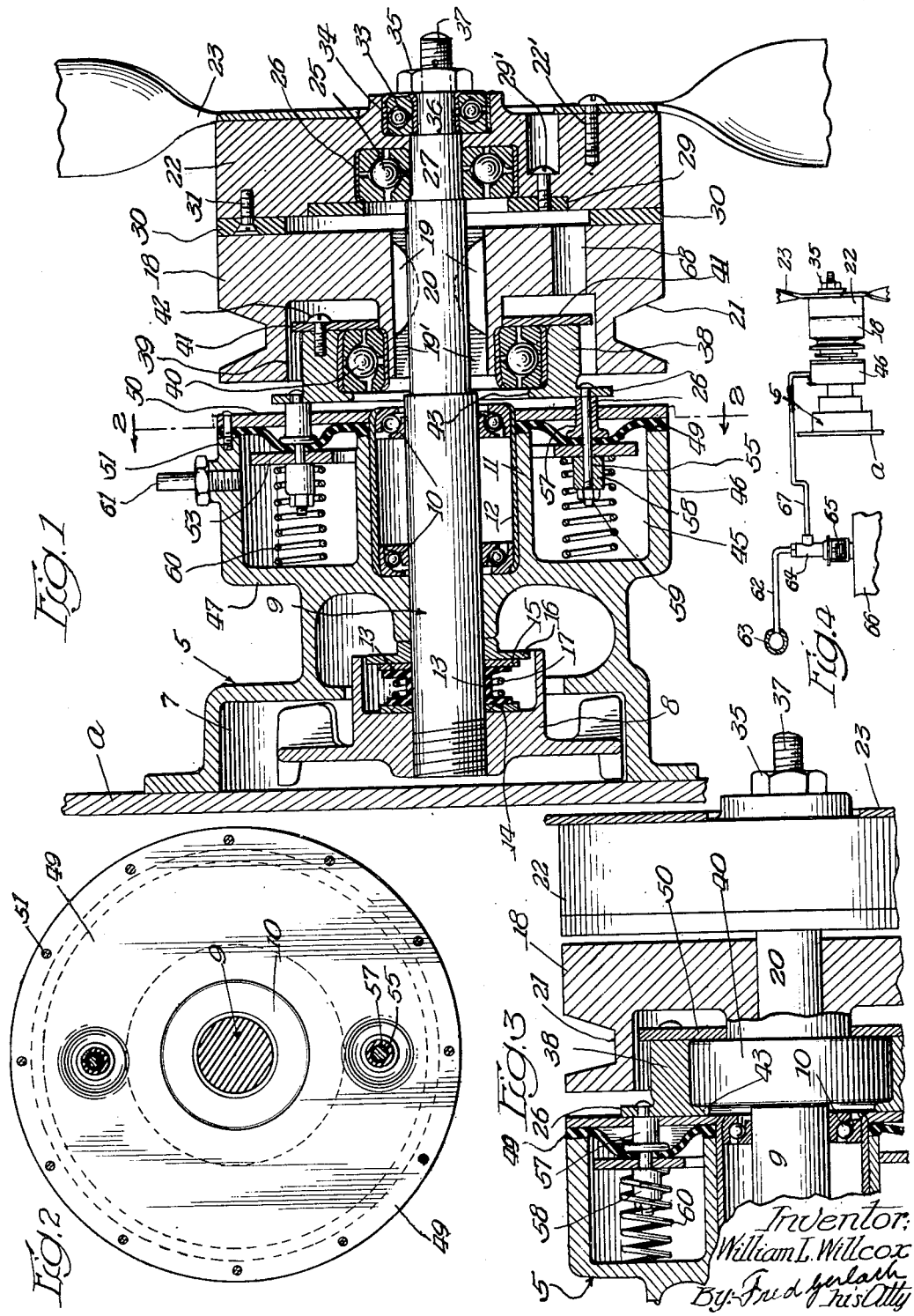

2,706,468

THERMOSTATICALLY CONTROLLED DRIVING MECHANISM FOR FANS ON ENGINE DRIVEN VEHICLES

William L. Willcox, Miami, Fla.

Application November 4, 1952, Serial No. 318,725

10 Claims. (Cl. 123—41.11)

The invention relates to devices for thermostatically controlling fans for engines on vehicles.

One object of the invention is to provide an improved device for automatically controlling the operation of the vehicle fan responsively to the temperature of the engine for fuel saving purposes.

Another object of the invention is to provide a device or control apparatus which automatically disconnects the fan from the engine responsively to predetermined variations, which is compact in construction, efficient in operation and can be produced at a low cost.

Another object of the invention is to provide a device for automatically controlling the operation of the fan responsively to predetermined changes in the temperature of the engine, which is cooperatively combined with the water pump for circulating coolant through the jacket of the engine.

Another object of the invention is to provide a device of this type in which the drive pulley is movable to drive the fan and is disposed between the suction chamber and the fan.

Another object of the invention is to provide a device of this type which includes a stationary suction or vacuum chamber concentrically disposed around the drive shaft and a belt pulley which is shiftable into and out of driving relation with the fan.

Other objects of the invention will appear from the detailed description.

The invention consists in the several novel features hereinafter described and more particularly defined by claims at the conclusion hereof.

In the drawings:

Fig. 1 is a longitudinal section of a mechanism embodying the invention;

Fig. 2 is a transverse section taken on the line 2—2 of Fig. 1;

Fig. 3 is a section similar to Fig. 1, parts being shown in elevation, the belt pulley being shown uncoupled from the fan;

Fig. 4 is a diagrammatic view of apparatus including the driving mechanism and its connections.

The improved mechanism comprises a housing generally designated 5, which is usually secured to a wall $a$ of an internal combustion engine. Housing 5 is provided at its inner end with a pump chamber 7 which, as well understood in the art, is connected to a suitable inlet and an outlet for the coolant circulated through the engine jacket and the radiator. An impeller 8 is rotatable in the pump chamber 7 for circulating the coolant. The impeller 8 is fixedly secured to a shaft, generally designated 9, which is journalled in a pair of anti-friction or ball bearings 10 mounted in the housing 5. Housing 5 includes an inner cylindrical wall 11 on which the case 12 of bearings 10 is fixedly secured. A seal for preventing the escape of liquid around the shaft and from housing 5 includes a flanged elastic sleeve 13, a washer 14 engaged by one of the flanges on said sleeve, a washer 15 engaged by the other flange on the sleeve. Washer 14 abuts against the inner end of an annular recess in the hub of impeller 8 and washer 15 abuts against a collar 16 which abuts against one end of the hub of housing 5. A spring 17 between the flanges of elastic sleeve 13 presses the flange against the washers 14 and 15 to form a seal around shaft 9 for preventing the escape of coolant from the pump chamber around said shaft. A pulley 18 for driving shaft 9 is slidable on and connected to drive said shaft by keys 19 which are slidably confined in keyways 19' in the hub of said pulley and extend into recesses on a portion 20 of shaft 9. Pulley 18 is provided with a V-shaped peripheral groove 21 for a belt (not shown) which is constantly driven while the engine is running. Shaft 9 constantly drives the impeller 8 while the engine is running.

A fan for blowing air on the engine and cooling it comprises a cylindrical hub 22 and fan blades 23 which are secured by screws 24 to said hub. Hub 22 is journalled on an anti-friction or ball bearing 25 for rotation of shaft 9 relatively to the fan. The bearing 25 fits in an annular recess 26 in hub 22 and extends around a portion 27 of shaft 9. Bearing 25 is held in recess 26 by a ring 28 which is secured by screws 29 to the inner face of hub 22. A ring 30 of friction material is secured by screws 31 to the inner face of hub 22 and is engaged by the outer face of pulley 18 for driving the fan from said pulley. A ball or anti-friction thrust bearing 33 is confined in an annular recess 34 formed in the outer end of hub 22 to resist the pressure exerted by the pulley 18 against the hub 22 of the fan. A nut 35 retains bearing 33 on a reduced end 36 of shaft 9 and is screw threaded to the outer end 37 of shaft 9.

Pulley 18 is axially slidable relatively to shaft 9 and keys 19, for selectively engaging the friction ring 30 on fan hub 22 and driving the fan. The pulley 18 is retractable from said ring for uncoupling the pulley from the fan and causing the pulley to discontinue the rotation of the fan. A non-rotatable ring or collar 38 is disposed in an annular recess 39 in the inner face of pulley 18 for axially shifting the rotatable pulley 18. An anti-friction or ball bearing 40 connects collar 38 and the hub of pulley 18. Bearing 40 has its inner race secured in the recess 39 on the hub of pulley 18. The outer race of bearing 40 fits in collar 38 and is secured for endwise movement with said collar by a ring 41 which is secured to said collar by screws 42 and a bead 43 on said collar. Collar 38 functions as a non-rotatable element for slidably shifting the pulley 18 on shaft 9.

A vacuum or suction responsive device is provided for shifting the collar 38 to uncouple the pulley 18 from the hub 22 of the fan when the operation of the fan is not necessary for cooling the engine. This device is controlled by suction from the intake manifold of the engine and a thermostatically controlled valve which is responsive to temperature of the coolant in the cooling system for controlling the suction from the manifold to the said device. This device comprises an annular suction or vacuum chamber 45 which is formed in the housing 5 by an outer cylindrical wall 46, an integral side wall 47 and the cylindrical wall 11 around the bearings 10. A diaphragm 49 of suitable elastic material forms the opposite side of the suction chamber 45. A circular plate 50 engages the diaphragm and clamps its inner and outer margins tightly against the cylindrical walls 11 and 46, respectively. Plate 50 is secured to the housing by screws 51. A ring 53 is secured against the inner face of diaphragm 49 and is shiftable axially with said diaphragm. Ring 53 and diaphragm 49 are secured together and to the collar 38 which shifts the pulley 18 by a pair of bolts 55. Bolts 55 are disposed at diametrically opposite points and are provided with heads which engage radial lugs 56 on collar 38. Said bolts extend through thimbles 57 between lugs 56 and the diaphragm 49, through ring 53 and through sleeves 58 which abut against the ring 53. Thimbles 57 are slidable in plate 50. Nuts 59 clamp the thimbles 57, diaphragm 49, rings 53 and sleeves 58 tightly together on bolts 55 to seal the diaphragm between thimbles 57 and ring 53. The inner and outer margins of the diaphragm 49 are clamped against the cylindrical walls 11 and 46 of the housing 5 for sealing the diaphragm to close the inner side of suction chamber 45. Springs 60 are interposed between ring 53 and the wall 47 of the housing for shifting collar 38 and pulley 18 on shaft 9 for coupling the pulley and fan, for driving the fan from the belt-driven pulley. A fitting 61 is communicatively connected with the suction chamber 45 for applying suction or vacuum to the inner face of diaphragm 49 for shifting collar 38 to uncouple the belt pulley 18 from hub 22 of the fan when the temperature of the engine drops to a point which renders the operation of the fan unnecessary. When there is no vacuum in chamber 45 springs 60 will shift collar 38 to shift pulley 18 into coupled relation with fan hub 22 and will hold them in such relation until the chamber 45 is again subjected to vacuum.

In Fig. 4 the invention is diagrammatically illustrated in connection with a vehicle engine. A pipe 62 is connected to the intake manifold 63 of the engine and to a valve 64. Valve 64 is controlled by a thermostatic bellows 65 which is subjected to the temperature of the coolant in the radiator or circulating around the engine 66 and controls the application of suction for vacuum to chamber 45 and diaphragm 49 via valve 64 and a pipe 67 which is communicatively connected to fitting 61 and suction chamber 45.

The operation will be as follows: While the engine is running and the operation of the fan is necessary for cooling the engine, the valve 64 will be closed to cut off vacuum from chamber 45, and springs 60 will be effective to shift ring 53, flex diaphragm 49, and shift bolts 55, thimbles 57, collar 38, bearing 44 and pulley 18 to press the driving face on pulley 18 against the friction ring 30 on hub 22 for driving the fan.

When the temperature of the engine is sufficiently low to render the operation of the fan unnecessary, for example 155° to 165° Fahr., bellows 65 will be contracted by the coolant in the radiator 66 and open valve 64. The suction in the intake manifold 63 will exhaust the air from the chamber 45 and flex the diaphragm 49 into the position shown in Fig. 3. This will shift ring 53, bolts 55, thimbles 57, sleeves 58, collar 38 and bearing 40 to slide the pulley 18 on portion 20 of shaft 9 and disengage the pulley from the friction face 30 on hub 22 of the fan, against the face of springs 60. The operation of the fan will thus be thermostatically controlled to remain idle responsive to the temperature of the coolant in the circulating system by the suction produced by the engine in the intake manifold as long as the temperature of the engine remains at a predetermined range, for example 155° to 165° F. As soon as the temperature rises above the predetermined range, valve 64 will be closed by the thermostat to cut off suction to the chamber 45 and cause springs 60 to move collar 38 to couple pulley 18 and the hub of the fan for the operation of the fan to cool the motor. When the temperature of the coolant drops to the predetermined range, valve 64 will be opened to apply suction to the diaphragm and cause it to move collar 38 to separate pulley 18 from fan hub 22 and stop the fan. While the fan is uncoupled from pulley 18, it will be free to rotate on, and relatively to, the constantly driven shaft 9. This permits the air pressure, while the vehicle is traveling forwardly, to windmill the fan without being driven by the engine.

The invention exemplifies a device or mechanism for controlling the operation of the fan responsively to temperature changes in the coolant for the engine, in which the belt pulley is movable for coupling and uncoupling the fan and pulley and simplicity in construction and efficiency in operation. It also exemplifies driving mechanism of this type which is combined with a pump for circulating coolant through the cooling system of the engine. The suction or vacuum chamber is compactly arranged at one side of the drive pulley, is stationary and operates a collar which is disposed in a recess in the pulley for compactness. The housing for the suction chamber and the pump are integrally formed. The bearings for the drive shaft are disposed centrally of the portion of the housing in which the suction chamber is formed, and the parts can be readily assembled or disassembled for repair or replacement. Holes 68 are provided in pulley 18 for access to screws 42. The bearings 25 and 33 in hub 42 are removable with the hub when the nut 35 is screwed off the stem 37 on shaft 9. When these have been removed, the screws 42 will be accessible through pulley 18 for turning the screws 42 to release ring 41 from collar 38 so that the pulley and bearing 40 can be removed endwise from collar 38. When the pulley 18 and bearing 40 have been thus removed, the plate 50, screws 51, and bolts 55 will be accessible for disassembling the diaphragm from the ring 53 and diaphragm 49.

A characteristic of the pulley and the fan hub is that they are provided on the confronting sides with driving faces for directly driving the fan from the belt and dispensing with separate or intermediate driving or coupling elements.

The invention is usable with the thermostatic valve set forth in my application filed November 4, 1952, Serial No. 318,724.

The invention is not to be understood as limited to the details set forth since these may be modified within the scope of the appended claims without departing from the spirit and scope of the invention.

Having thus described my invention, what I claim as new and desire to secure by Letters Patent is:

1. Apparatus for the operation of an engine-driven fan, comprising: a non-rotatably supported housing, a shaft journalled in the housing, a fan including a hub, journalled and held against axial movement on the shaft, a pulley slidable on and connected to rotate the shaft, one side of the pulley and a contiguous side of the fan hub having confronting driving surfaces, the housing being provided with an annular chamber surrounding the shaft and a suction connection with the engine, and having a side contiguous to and confronting the other side of the pulley, an element in said chamber operable by suction, means, between said element and the side of the pulley contiguous to the housing, for shifting the pulley out of driving relation with the fan hub and means for shifting the pulley into driving relation with the fan-hub when suction is released.

2. Apparatus for the operation of an engine-driven fan, comprising: a non-rotatably supported housing, a shaft journalled in the housing, a fan including a hub, journalled and held against axial movement on the shaft, a pulley slidable on and connected to rotate the shaft, one side of the pulley and a contiguous side of the fan hub having confronting driving surfaces, the housing being provided with an annular chamber surrounding the shaft and a suction connection with the engine, and having a side contiguous to and confronting the other side of the pulley, an element in said chamber operable by suction, means between said element and the side of the pulley contiguous to the housing for shifting the pulley out of driving relation with the fan hub, and spring means in said chamber for shifting the pulley into driving relation when suction is released.

3. Apparatus for the operation of an engine-driven fan, comprising: a non-rotatably supported housing, a shaft journalled in the housing, a fan including a hub, journalled and held against axial movement on the shaft, a pulley slidable on and connected to rotate the shaft, one side of the pulley and a contiguous side of the fan hub having confronting driving surfaces, the housing being provided with an annular chamber surrounding the shaft, and a suction connection with the engine, and having a side contiguous to and confronting the other side of the pulley, an annular diaphragm in said chamber surrounding the shaft, operable by suction, means between said diaphragm and the side of the pulley contiguous to the housing, for shifting the pulley out of driving relation with the fan hub and means for shifting the pulley into driving relation with the fan-hub when suction is released.

4. Apparatus for the operation of an engine-driven fan, comprising: a non-rotatable housing, a shaft, a bearing for the shaft in the housing, a fan including a hub, journalled and held against axial movement on the shaft, a pulley slidable on and connected to rotate the shaft, one side of the pulley and one side of the fan hub having confronting driving surfaces, the housing being provided with an annular chamber surrounding the bearing for the shaft, and a suction connection with the engine, and having a side contiguous to and confronting the other side of the pulley, an annular diaphragm in said chamber, surrounding said bearing, and operable by suction, elements slidably supported in the housing between said diaphragm and the side of the pulley contiguous to the housing for shifting the pulley out of driving relation with the fan hub and means for shifting the pulley into driving relation with the fan-hub when suction is released.

5. Apparatus for the operation of an engine-driven fan, comprising: a non-rotatably supported housing, a shaft journalled in the housing, a fan including a hub, journalled and held against axial movement on the shaft, a pulley slidable on and connected to rotate the shaft, one side of the pulley and a contiguous side of the fan hub having confronting driving surfaces, the housing being provided with an annular chamber surrounding the shaft and a suction connection with the engine, and having a side contiguous to and confronting the other side of the pulley, a diaphragm in said chamber operable by a non-rotatable collar on the pulley, contiguous to the housings, slidable means between said diaphragm for shifting the pulley out of driving relation with the fan hub, and spring means in said chamber for shifting the pulley into driving relation when suction is released.

6. Apparatus for the operation of an engine-driven fan, comprising: a non-rotatably supported housing, a shaft journalled in the housing, a fan including a hub journalled on the shaft, a drive pulley slidable on and for rotating the shaft, one side of the hub and a contiguous side of the pulley having confronting sides with driving surfaces, the housing being provided with an annular chamber surrounding the shaft and a suction connection with the engine and having a side contiguous to and confronting the other side of the pulley, an element in said chamber, operable by suction, the pulley being provided with an annular recess in its side contiguous to the housing, a non-rotatable collar in said recess connected to slidably shift the pulley, means between the element and the collar for shifting the pulley out of driving relation with the fan hub and means for shifting the pulley into driving relation with the fan-hub when suction is released.

7. Apparatus for the operation of an engine-driven fan, comprising: a non-rotatably supported housing, a shaft journalled in the housing, a fan including a hub journalled on the shaft, a drive pulley slidable on and for rotating the shaft, one side of the hub and a contiguous side of the pulley having confronting sides with driving surfaces, the housing being provided with an annular chamber surrounding the shaft and a suction connection with the engine and having a side contiguous to and confronting the other side of the pulley, a diaphragm in said chamber, operable by suction, the pulley being provided with an annular recess in its side contiguous to the housing, a non-rotatable collar in said recess, on and connected to slidably shift the pulley, means slidably mounted in the side of the housing contiguous to the pulley and connecting said diaphragm and the collar, for shifting the pulley out of driving relation with the fan hub and means for shifting the pulley into driving relation with the fan-hub when suction is released.

8. Apparatus for the operation of a vehicle fan and pump for coolant, on an engine-driven vehicle, comprising: a housing separate from and supported on an engine, and provided with a pump chamber, a shaft journalled in the housing, an impeller in the pump chamber and fixed to said shaft, a pulley adapted to be driven from the engine, slidable on and connected to the shaft, a fan including a hub journalled on the shaft, the housing being provided, between the pump-housing and pulley, with an annular chamber around the shaft and a suction connection with the engine, an element operable in said annular chamber by suction, one side of the pulley and one side of said hub having confronting and contiguous driving surfaces, one side of the housing and the other side of the pulley having contiguous and confronting sides, means operable by said element for shifting the pulley out of driving relation with the fan hub and means for shifting the pulley into driving relation with the fan-hub when suction is released.

9. Apparatus for the operation of a vehicle fan and a pump for coolant, on an engine-driven vehicle, comprising: a housing separate from and supported on an engine, and provided with a pump chamber, a shaft journalled in the housing, an impeller in the pump chamber and fixed to said shaft, a pulley adapted to be driven from the engine, slidable on and connected to the shaft, a fan including a hub journalled on the shaft, the housing being provided between the pump and the pulley with an annular chamber around the shaft and a suction connection with the engine, a diaphragm in said annular chamber operable by suction, one side of the pulley and one side of said hub having confronting and contiguous driving surfaces, one side of the housing and the other side of the pulley having contiguous confronting sides, means slidable in the housing and means operable by said diaphragm for shifting the pulley out of driving relation with the fan hub, and spring means in the annular chamber for shifting the pulley into driving relation with the fan hub.

10. Apparatus for the operation of a vehicle fan and a pump for coolant, on an engine-driven vehicle, comprising: a housing separate from and supported on an engine, and provided with a pump chamber, a shaft journalled in the housing, an impeller in the pump chamber and fixed to said shaft, a pulley adapted to be driven from the engine, slidable on and connected to the shaft, a fan including a hub journalled on the shaft, the housing being provided between the pump chamber and the pulley with an annular chamber around the shaft, and a suction connection with the engine, a diaphragm operable in said annular chamber by suction, one side of the pulley and one side of the hub having confronting and contiguous driving surfaces, one side of the housing and the other side of the pulley having contiguous confronting sides, the pulley having an annular recess in its side which is contiguous to the housing and a hub in said recess, a collar journalled on the hub of the pulley and elements slidable in the housing and operable by said diaphragm for shifting the pulley out of driving relation with the fan hub, and spring means for shifting the pulley into driving relation with the fan hub.

References Cited in the file of this patent

UNITED STATES PATENTS

| | | |
|---|---|---|
| 1,374,901 | Blankenhorn | Apr. 19, 1921 |
| 1,782,513 | Roos | Nov. 25, 1930 |
| 1,837,564 | McCaleb | Dec. 22, 1931 |
| 2,022,709 | Embery et al. | Dec. 3, 1935 |
| 2,506,520 | Spase | May 2, 1950 |